Aug. 23, 1960 R. T. LOEWE 2,950,466

SATURABLE AMPLIFIER

Filed Oct. 22, 1956 5 Sheets-Sheet 1

INVENTOR.
RICHARD T. LOEWE

BY

ATTORNEY

INVENTOR.
RICHARD T. LOEWE
BY
Allan Rothenberg
ATTORNEY

SATURABLE AMPLIFIER

Filed Oct. 22, 1956 5 Sheets-Sheet 3

INVENTOR.
RICHARD T. LOEWE
BY Allan Rothenberg
ATTORNEY

INVENTOR.
RICHARD T. LOEWE
BY
Allan Rothenberg
ATTORNEY

INVENTOR.
RICHARD T. LOEWE
BY
Allan Rothenberg
ATTORNEY

United States Patent Office 2,950,466

Patented Aug. 23, 1960

2,950,466

SATURABLE AMPLIFIER

Richard T. Loewe, Whittier, Calif., assignor to North American Aviation, Inc.

Filed Oct. 22, 1956, Ser. No. 617,562

18 Claims. (Cl. 340—174)

This invention relates to saturable amplifiers and more particularly to a saturable amplifier for providing a controlled output signal representative of one or more input signals which may be sequentially or simultaneously applied thereto.

The present invention is based upon the operation of a saturable device as particularly described in applicant's co-pending application for Saturable Comparator, Serial No. 609,713, filed September 13, 1956. Disclosed in said co-pending application is the operation of a saturable device such as, for example, a magnetic or ferromagnetic element having a hysteresis loop which is substantially "square" with vertical sides, sharp knees, and a flat top and which is driven into nonsaturation from a condition far into saturation whereby the nonsaturated condition thereof will appear as a sharp discontinuity.

A saturable device within the scope of the concepts of the present invention is herein designated as a device formed of a material having a variable physical arrangement of elemental units thereof which arrangement defines the condition or state of the device. Such arrangement may be, for example, the orientation of the elemental magnetic domains of magnetic material which define the various magnetic conditions of the device or it may be the orientation of the atomic structure of ferroelectric material which provides a particular electrical charge displacement. In such saturable devices, as is well-known, this physical arrangement may be varied by application of a driving force to the material. Upon increase of the magnitude of the driving force, increased rearrangement of the elemental units occurs until the driving force reaches a magnitude which has caused to exist in the material, after the time necessary for the rearrangement, a physical condition which is a substantially maximum rearrangement of elemental units such that further increase in the driving force will have but a relatively small tendency to effect further rearrangement. Such condition of substantially maximum rearrangement is herein defined as the physically saturated condition or state of saturation of the saturable device while the condition in which the rearrangement is less than such maximum rearrangement is termed the transition or nonsaturated state of the device.

Normally, the operating range of such saturable devices is limited to the linear portion of the nonsaturated region or to the entire nonsaturated region, or to a range only far enough into the saturated regions to insure two stable states of operation. This invention embodies the concept of extending the operating range of such saturable devices by an order of magnitude such that the entire nonsaturated range is only a small fraction of the total operating range, thereby allowing several new and different circuits to be designed which recognize the changes in state of the saturable variable when a composite applied driving force causes the device to pass from one saturated region thereof.

In accordance with the present invention there is applied to a saturable device a pair of driving forces of opposite sense and each of a magnitude which is sufficient to drive said device into one of its saturated states. One of these driving forces is representative of an input signal which is to be transferred to the output of the apparatus. Such input signal produces an input force which has a predetermined maximum magnitude or full scale value which is considerably greater than a minimum force required to drive the device into saturation whereby such minimum force is but a negligible fraction of the input force. The order of magnitudes is so chosen that the ratio of the magnitude of said minimum force to the full scale magnitude is approximately equal to the allowable error of the device. Feedback means is provided to apply to the saturable device a second driving force which is substantially equal and opposite to the input force whereby a signal flowing in the feedback circuit will be representative of an input signal which produces the input driving force. An error or difference between the input and feedback forces is sensed by interrogating the device to determine which saturated state it is in. This interrogation is achieved by causing the saturable device to be repetitively shifted from its saturated state and these shifts of state are utilized to control the feedback force in order to maintain the resultant driving force substantially at zero or in or close to the nonsaturated region. Each shift of the device from its saturated state appears as a sharp discontinuity which is easily sensed. For a ferroelectric device the discontinuity may appear as a sharp change in charge displacement across the device while for a magnetic element the shift into nonsaturated condition appears as a sharp induced voltage pulse in a sensing winding on the element or as a sharp change of impedance of any winding. The feedback circuit may include means for determining on which side of zero the resultant of the input and feedback driving forces lies whereby the feedback force is generated in a sense opposite to the sense of the input force irrespective of the sense of the latter.

In a magnetic device operated in accordance with principles of this invention the feedback winding may have fewer turns than the input windings whereby current amplification of the input signal is provided. The input driving force may comprise a plurality of simultaneously applied driving force components which are weighted in accordance with a parallel digital code whereby a signal in the feedback circuit is an analog of the digital input.

The principles of this invention may also be utilized in a multiplexing system capable of high speed switching, capable of operation at low signal levels or both. Such multiplexer provides an extremely simple method of handling either single or double ended inputs and may obtain advantages in accuracy, reliability, cost, size, low drift, and ruggedness. For such multiplexing system a plurality of signals to be multiplexed are applied to a plurality of saturable devices operated in accordance with the principles of this invention and the means for sensing the shift of each such device is sequentially coupled to a feedback circuit which thus sequentially maintains the net driving force of each of the saturable devices at zero. Thus the signal in the feedback circuit is sequentially representative of each of the input signals in accordance with the sequential switching of the sensing means of each saturable device to the feedback circuit.

It is an object of this invention to provide improved means for controlling the transfer of a D.-C. signal between two circuits.

It is a further object of this invention to provide an improved D.-C. amplifier.

Another object of this invention is the operation of a saturable device in order to provide digital-to-analog conversion.

Still another object of this invention is the operation of a saturable device for switching low level analog signals.

Another object of this invention is the provision of a high speed saturable switching system.

A further object of this invention is the provision of a saturable multiplexer.

A further object of this invention is the operation of a single saturable device for both summing and amplifying a plurality of signals.

Other objects of this invention will become apparent from the following description taken in connection with the accompanying drawings, in which Fig. 1 represents a hysteresis curve of a magnetic element having properties adapted to the practice of the disclosed invention;

Fig. 2 is a schematic representation of the circuit of a saturable magnetic amplifier;

Figs. 3 and 4 graphically illustrate the operation of the circuit of Fig. 2;

Figures 5, 10:
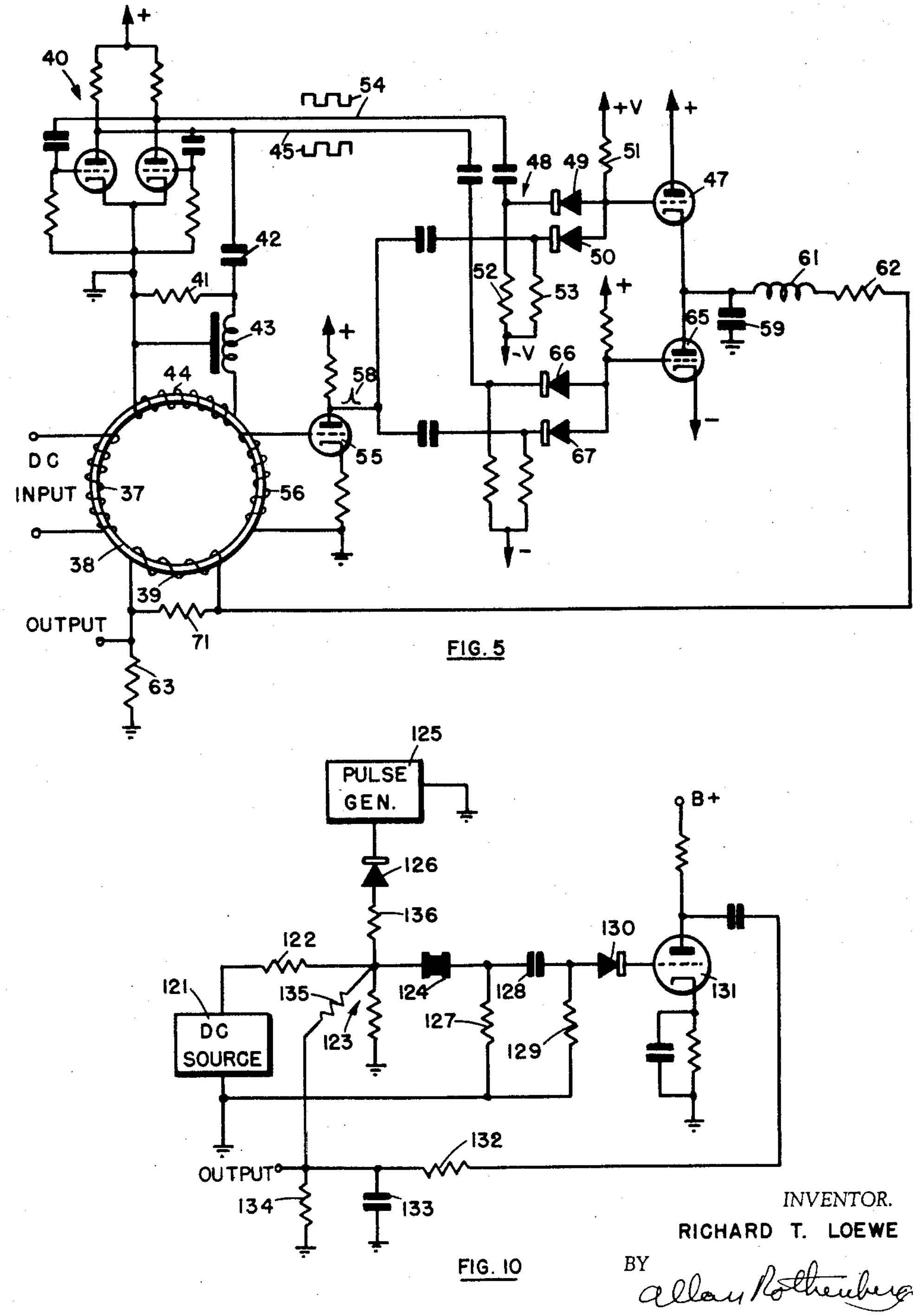
Fig. 5 is a circuit diagram of a modified form of saturable magnetic amplifier.

And Fig. 10 is a schematic representation of the circuit of a saturable ferroelectric amplifer.

Figure 1:
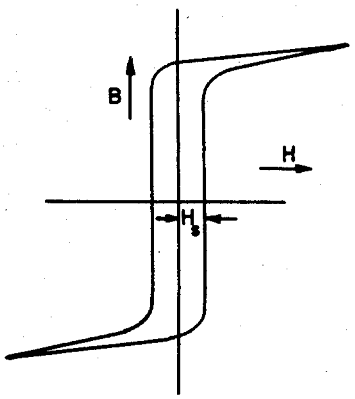

Referring to Fig. 1, the hysteresis characteristic, the variation of flux density B with applied magnetomotive force H, of a material suitable for use as a magnetic saturable device of this invention preferably has a generally rectangular shape with substantially vertical sides and a high ratio of residual magnetic flux density to the flux density at saturation. The curve has a flat top indicative of relatively small changes in flux density in and beyond saturation. That is, while a relatively rapid rearrangement of magnetic domains occurs as the magnetomotive force increases from zero to $H_s$, further increase of driving force will effect but a negligible additional rearrangement. The curve has sharp knees such that upon increase of the driving magnetomotive force to a minimum saturating value $H_s$ the magnetic material is driven rapidly into saturation. In accordance with the principles of this invention, the magnetomotive driving force is of such a magitude that the magnetic material is operated far into its saturated state whether positive or negative and the minimum saturating force $H_s$ is but a small fraction of the maximum magnetomotive force applied to the device. If the driving force is allowed to vary from a value close to zero or somewhat less than $H_s$ to a value many times $H_s$ and vice versa, the shift of the device from a saturated physical state to its non-saturated condition or transition state appears as a sharp discontinuity and a sensing coil on the device will produce the sharp voltage pulse as the device enters its transition state. With the application of such driving force which is so much larger than the minimum saturating force $H_s$ the transition state, which is actually of the near rectangular form depicted in Fig. 1, appears as a sharp discontinuity and in effect the hysteresis curve of the material appears to such large driving force substantially as the sharply discontinuous linear curve depicted as curve A in Fig. 3. In other words, the the value represented by $H_s$ is so much smaller than the value of the maximum applied driving force that $H_s$ may be neglected.

There are several well-known magnetic materials of nickel iron alloys having high permeability which may be utilized in this invention and magnetic material such as Deltamax manufactured by the Allegheny Ludlum Steel Corporation, is an example of one such material.

The ferroelectric materials such as barium titanate, guanidinium aluminum sulphate hexahydrate and varieties thereof as described, for example, on pages 121–125 of The Bell Laboratories Record, April 1956, comprise another group of saturable substances which have a pair of opposite sense saturated physical states and a transition or transient state therebetween. If the displacement of electric charge of such ferroelectric material is plotted against the applied field strength, the driving force, there results a ferroelectric hysteresis curve which is substantially similar to the magnetic hysteresis curve. The displacement of charge of a ferroelectric is not a single valued function of the applied electric field, but depends on the voltage history of the material. When no field is applied the material has a spontaneous or remanent displacement and a minimum finite electric field, the coercive force, is required to switch the displacement from a positive value of charge displacement to a negative value thereof. Thus, as particularly described in the above-mentioned copending application, if the material is in its positive displacement condition which may be termed a positive condition of saturation, a positive driving force or electric field, of magnitude much greater than the coercive force, when applied thereto will produce a relatively slow increase in charge displacement, whereas a negative driving force applied thereto will produce a more rapid charge displacement of opposite sense, shifting the material between its two conditions of oppositely directed charge displacement from one saturated state through its transient state to the other saturated state. The rapid change in displacement can be sensed by a differentiating circuit. As in the saturable magnetic material, if the driving force applied to the ferroelectric device be substantially larger than the minimum saturating or coercive force, the width of the transient region between opposite sense conditions of remanent displacement becomes negligible. Here again the transition state appears as a sharp discontinuity upon the shift of the device from either of its saturated states.

Any other material, such as Supermalloy, which saturates, but does not have the square hysteresis characteristic, could also be used. In some cases, complete lack of hysteresis is desirable.

Figure 2:
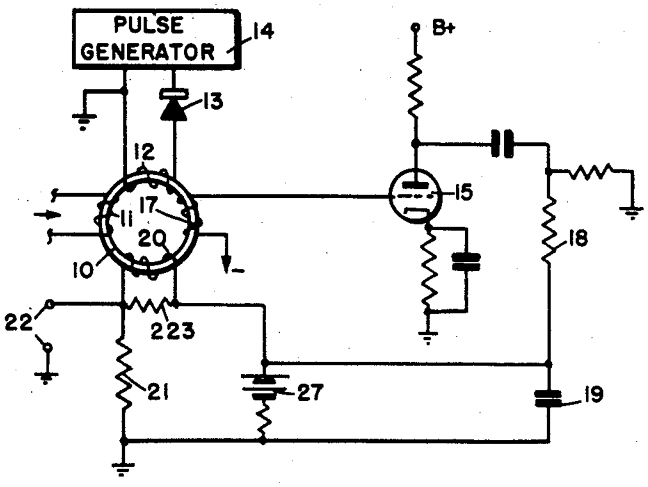

Referring now to Fig. 2, a saturable magnetic core 10 has wound thereon an input coil 11 which is energized from a source of input signal (not shown) to produce a magnetomotive driving force in the core of a magnitude which may vary from zero up to a maximum or full scale value which is many times greater than the magnitude of the minimum driving force required to saturate the core. A pulse winding 12 is fed through diode 13 with a train of unidirectional pulses from pulse generator 14 to produce a train of driving pulses in the core having a magnitude which is at least equal to the predetermined maximum value of the driving force produced by the input winding 11 whereby each pulse will effect a shift of the device through its non-saturated state if the net force on the device is of a polarity opposite to the polarity of the pulses. Vacuum tube 15 is caused to conduct heavily by positive pulses applied to the grid thereof from sensing winding 17 which has a sharp pulse induced therein for each shift of state of the core. Tube 15 is normally cut off by a negative potential applied to its grid through winding 17 whereby negative pulses from the winding have no effect on the output of the tube. Negative pulses at the plate of tube 15 are fed to the integrating network comprising resistor 18 and capacitor 19 and the output of the integrating network is fed back to a feekback coil 20 on the core which is so poled as to produce a driving force in the core which is of a sense opposite to the sense of the input driving force generated by winding 11. The discharge current of the capacitor 19 is fed through load resistor 21 in series with the winding 20 whereby the signal at output terminals 22 represents the current in the feedback loop and the feedback magnetomotive force. In operation, the core performs the function of summing the opposing forces produced by windings 11 and 20. The forces produced by these two windings oppose each other and the described feedback circuit strives to maintain the resultant magnetizing force at zero. This resultant force produced by the ampere turns in windings 11 and 20 represents the error between the unknown input current in coil 11 and the output current through resistor 21 of the feedback loop. When the error signal is zero the ampere turns of windings 11 and 20 are equal, thus the output current through winding 20 is directly related to the input current through winding 11 by the turns ratio of the two windings and current amplification is provided by simply having a greater number of turns on winding 11. If desired, further amplification may be provided by shunting a portion of the feedback current across winding 20 by means of resistor 223. If deemed necessary, amplification other than or in addition to that provided by triode 15 may be provided as for example by a conventional blocking oscillator.

In order to reduce the effect of the shifting of the core through its transition state upon the circuit of the source of input signal there may be provided a suitable filter in the input circuit as will be readily apparent to those skilled in the art.

Figure 3:
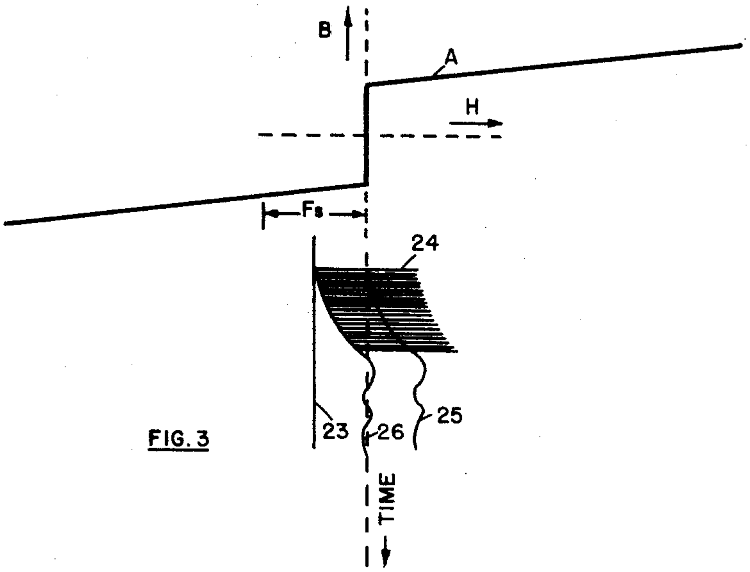

As indicated in Fig. 3, the unknown current fed to winding 11 may produce a magnetomotive force 23 of negative sense having a value somewhat less than the full scale value indicated by FS. The positive going pulses 24 applied to the core by winding 12 will repetitively effect a decrease in the sum of the driving forces due to windings 11 and 12 whereby the core will be repetitively shifted through the nonsaturated region. The pulses thus generated in the sensing winding 17 will produce an increasing negative charge on capacitor 19 by action of the amplifier whereby a feedback force component 25 is applied to the core by the winding 20. As the capacitor charge builds up, the current through winding 20 increases and the sum of the driving forces applied to the core by windings 11 and 20 decreases and remains substantially at zero as indicated at 26. When the net force 26 goes positive the pulses 24 will not cross the nonsaturated region to induce pulses in the sensing winding 17 so that the discharge current from the capacitor decreases thus effecting a decrease in the feedback driving force 25. It will be seen then that the feedback circuit tends to maintain a feedback driving force 25 substantially equal and opposite to the input driving force 23. Since the current in the feedback loop is directly related to the feedback driving force the output signal across resistor 21 is representative of the input signal and may, as explained above, be of greater magnitude.

Figure 4:
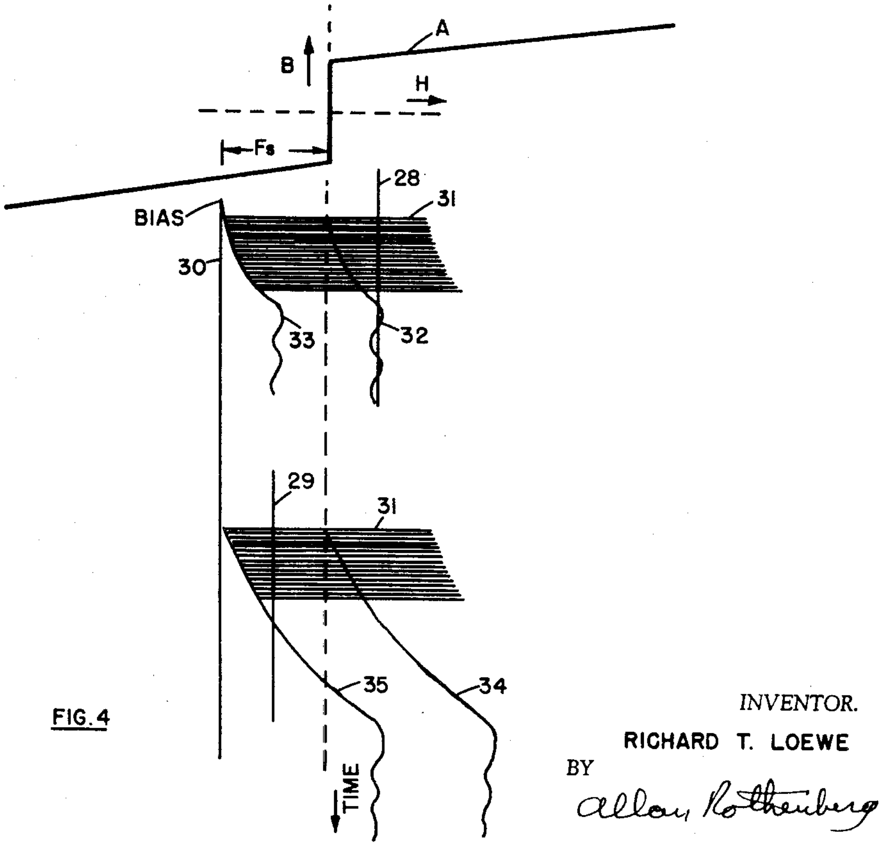

The operation described above neglects the presence of the fixed bias source 27 and thus must be based upon a known single polarity of the input signal. The fixed bias source 27 may be provided in order to permit the operation of the circuit with an input signal of either positive polarity as indicated at 28 of Fig. 4 or of negative polarity as indicated at 29. The bias source provides a negative magnetomotive driving force 30 which is at least equal to the full scale value of the input signal of either polarity if the input signal has equal full scale values at both polarities. In this arrangement the pulses 31 generated by coil 12 must have a magnitude at least equal to twice full scale value as indicated in Fig. 4. Thus the discharge current of the capacitor will produce a positive magnetomotive force component 32 which reduces the net force applied by winding 20 to a value 33 which is substantially equal and opposite to the unknown positive input force 28 or will produce a driving force component 34 which causes the net force 35 applied by winding 20 to be equal and opposite to the unknown negative input force 29. The magnitude and polarity of the unknown input force in this arrangement is indicated by the magnitude and polarity of the feedback current.

It will be readily appreciated that the fixed bias could also be provided by a separate winding on the core energized from a fixed source of potential or could be obtained by a fixed bias current component applied in series with winding 11. Thus, for bipolar operation (an unknown signal input of unknown polarity) the driving pulses are made to be at least equal to the sum of full scale and bias values while the pulses may be equal to full scale value if the polarity of the input signal is known.

Figure 6:
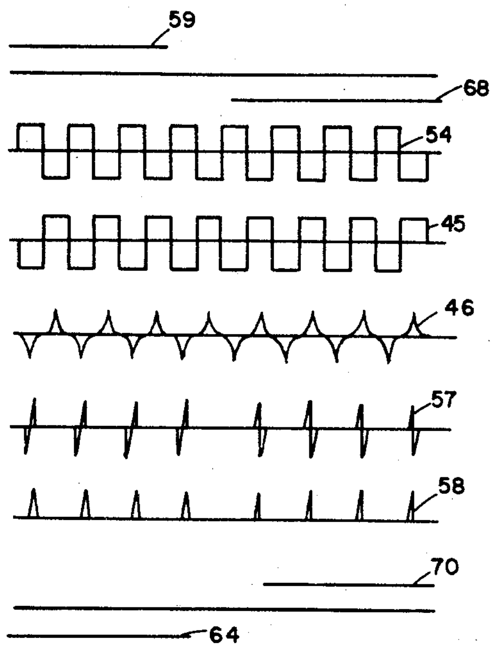
Fig. 6 is a syncrograph of the wave forms at several points of the circuit of Fig. 5.

Another circuit for interrogating the core to determine the polarity of saturation thereof and provide a feedback force of proper sense and magnitude for substantially balancing out a driving force produced by a bipolar input signal is shown in Fig. 5. The unknown input is applied to winding 37 on saturable core 38 to produce a full scale driving force of a magnitude which, as explained above, is considerably greater than the magnitude of the minimum driving force required to saturate the core. The circuitry is arranged to produce a feedback driving force caused by winding 39 which has a magnitude substantially equal to the magnitude of the input force and has a polarity opposite to the polarity of the input force whether such input polarity be positive or negative. In effect the circuitry determines the polarity of the state of saturation of the core and produces a feedback component of a polarity which tends to decrease the total driving force applied to the core. A free running multivibrator 40 produces a square wave 45 (Figs. 5 and 6) which is differentiated in the resistance-capacitance network 41, 42, delayed in delay network 43 and fed to winding 44 to produce a train of pulses 46 (Fig. 6) of alternate polarity each of which occurs during a corresponding relatively stable state of the multivibrator by virtue of the time delay which may be of a duration of approximately one-quarter cycle of the square wave 45. The driving force pulses produced by coil 44 have a magnitude at least equal to full scale value of the input driving force whereby the negative force pulses of pulse train 46 will drive the core through the nonsaturated region from a condition of net positive saturation and positive force pulses of train 46 will drive the core through the nonsaturated region from a condition of net negative saturation. Depending upon the direction or sense of net saturation of the core resulting from the net driving forces in input coil 37 and feedback coil 39, the feedback circuitry will produce a feedback current component of one polarity or the other which is of such a sense as to drive the net resultant force due to windings 37 and 39 to zero.

Tube 47 is normally cut off by the coincidence gate 48 comprising diodes 49, and 50, each of which is normally conducting current from a positive source of potential +V through resistor 51 and resistors 52 and 53, respectively, to a negative source potential −V. The potentials and resistors are arranged so that the grid to cathode potential of tube 47 is substantially negative to maintain the tube at cut off when either of the diodes is conducting. Square wave 54 (Fig. 6) is applied to the cathode of diode 49 from the plate of one of the tubes of multivibrator 40 whereby the diode may be driven into cut off during positive swings of square wave 54. Normally conducting tube 55 is cut off by the negative going portion of a pulse 57 generated in sensing winding 56 on the core each time the core shifts from its saturated state in response to either a positive or negative going pulse of the train 46 applied to winding 44. The positive pulse 58 from the plate of tube 55 produced by cessation of conduction thereof is applied to the cathode of the second diode 50 of the coincidence gate 48. If the resultant magnetomotive force produced by windings 37 and 39 is positive as indicated at 59 in Fig. 6, only negative going pulses of the train 46 will produce the output pulses 57 from winding 56 whereby the positive pulses 58 applied to diode 50 will occur during the positive swing of the square wave 54 applied to the diode 49. Thus both diodes at the gate 48 will be simultaneously cut off and a positive pulse appears on the grid of tube 47 and also on the cathode thereof whereby capacitor 59 connected in the cathode circuit of tube 47 will be charged positively. The discharge current of the capacitor is fed through a filter comprising coil 61 and resistor 62 through the feedback winding 39 and output resistor 63 to produce a feedback component driving force due to the repetitive conduction of tube 47 which, as indicated at 64, is of a direction which opposes the driving force 59 whereby the net magnetomotive force due to windings 37 and 39 will be maintained substantially at zero. The magnitude of the discharge current flowing in the feedback circuit is directly related to the magnitude of the input signal and the polarity of such feedback current which produces the negative magnetomotive force component 64 indicates a polarity of an input signal which causes a positive input driving force.

Tube 65 has its cathode connected to a source of negative potential well below ground and is normally held at cut off by conduction of current through either diode 66 or 67 in the same manner as described in connection with the coincidence gate 48. The diode 67 is also fed with the positive pulses 58 from tube 55 while the diode 66 is fed with a square wave 45 from the multivibrator 40 which is of a polarity opposite to the polarity of the square wave 54 (being derived from the other tube of the multivibrator). This portion of the circuitry functions when the net driving force 68 in the core is negative since only positive pulses of pulse train 46 will produce a shift of state of the core. Thus when the resultant force 68 is negative, pulses 58 which are fed to diode 67 will occur only during the positive swing of the square wave 45. Coincidence of pulses 58 and the positive swing of square wave 45 will effect cut off of both diodes 66 and 67 producing a positive pulse on the grid of tube 65, causing tube 65 to conduct, thereby making the charge on capacitor 59 more negative. The capacitor will now produce a feedback current component which is of such a sense as to cause coil 39 to produce a feedback driving force 70 which is positive. Thus the described feedback circuitry in effect senses the polarity of the net driving force in the core or the direction of saturation thereof and produces a feed-back force which tends to maintain the net driving force produced by the windings 37 and 39 substantially at zero whereby the polarity or magnitude of the feedback current represents the polarity and magnitude of the unknown input.

As in the circuit of Fig. 2, amplification may be provided by proper choice of the turns ratio of windings 37 and 39 or by providing a shunt resistor 71 across winding 39.

It will be readily seen that the multivibrator frequency should be much higher than the desired response frequency of the circuit.

Figure 7:
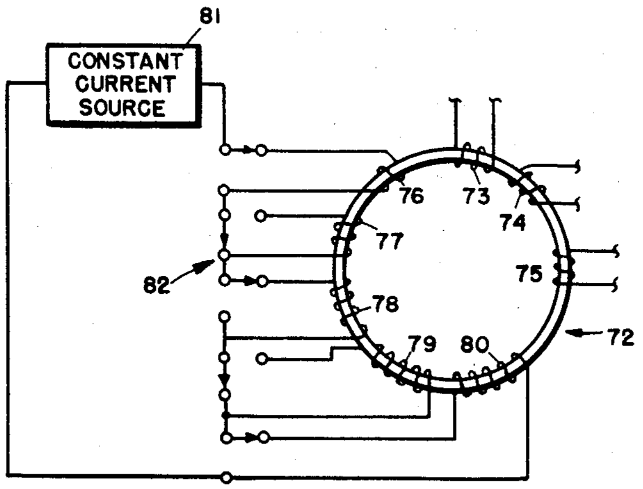
Fig. 7 is a schematic representation of parts of a saturable magnetic digital-to-analog converter.

It may be seen that amplification of the sum of a plurality of input signals may be provided by the circuits of either Fig. 2 or Fig. 5 simply by feeding each of several unknown input signals to a separate winding on the core whereby the feedback driving force would then be caused to be substantially equal and opposite to the sum of the input forces which are summed in the core itself. This operation may be utilized for digital-to-analog conversion as indicated in Fig. 7 wherein a core 72 has wound thereon a pulse winding 73 similar to winding 44 of Fig. 5, a sensing winding 74 similar to winding 56 of Fig. 5, and a feedback winding 75 similar to winding 39 of Fig. 5. Windings 73, 74 and 75 may be connected to the same circuitry (shown in Fig. 5) as are the previously described windings 44 and 56 and 39, respectively. For digital-to-analog conversion the input driving force is provided as a simultaneously applied group of weighted driving force components in accordance with a predetermined digital code. Thus the input driving force may be produced by the driving force components applied to the core by input coils 76, 77, 78, 79 and 80, respectively, which have a different number of turns as indicated in Fig. 7. Each of coils 76 through 80 may be energized from a constant current source 81 through a mechanical or electronic switch schematically depicted at 82. Each switch is in series with the constant current source 81 and, in one position thereof, with one of the input coils whereby a driving force of magnitude in accordance with the number of turns of a selected input coil may be applied to the core by operating an appropriate switch or a predetermined combination of the switches may be operated to apply to the core a plurality of input driving forces in accordance with a predetermined digital code. The specific details of such switches and the manner of operating them in accordance with a parallel digital code are well-known to those skilled in the art and the details of such switches form no part of this invention. The driving forces applied to the core by the coils 76 through 80 are of like sense and of magnitudes such that the magnitude of the least of such driving forces is greater than the minimum magnetomotive force required to drive the core into saturation. Thus the signal in the feedback circuit is maintained at a value which will apply to the core, through feedback coil 75, a driving force which is equal and opposite to the sum of the weighted force components applied by coils 76 through 80 and therefore the current in the feedback circuit is an analog of the parallel digital input. It will be readily appreciated that the weighting of the input force components may be achieved with input coils having the same number of turns by providing weighted currents in the respective input coil circuits.

Figure 8:
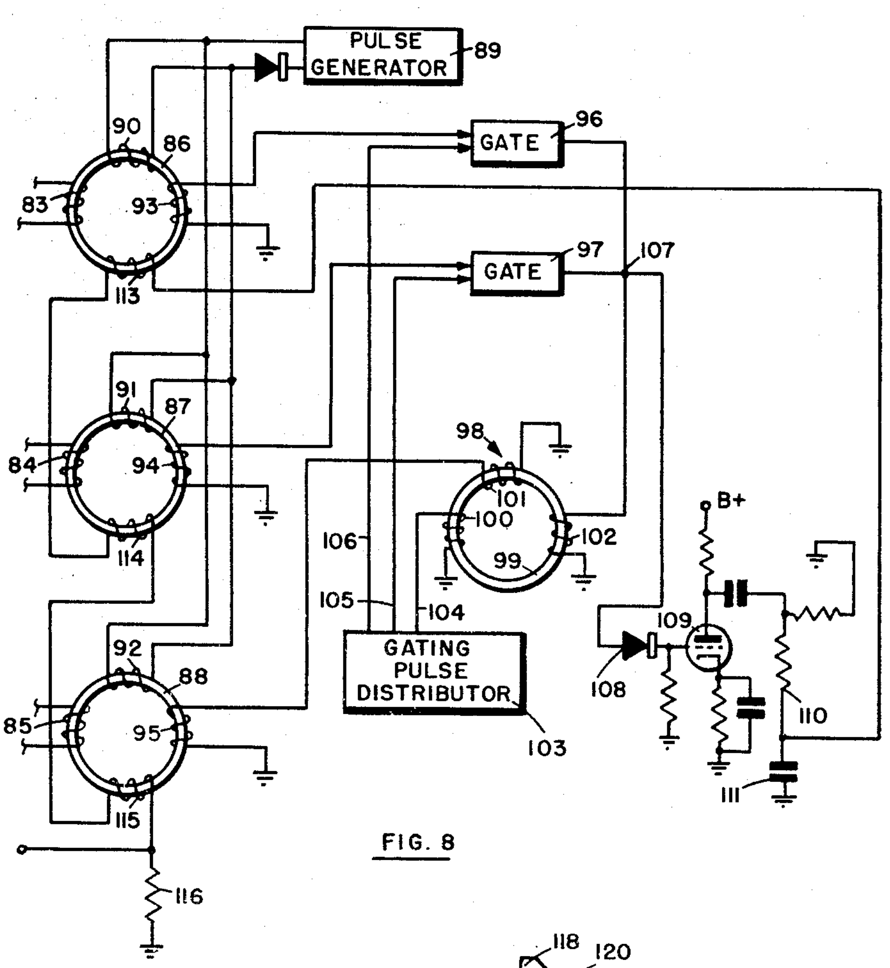
Fig. 8 is a schematic representation of a saturable magnetic multiplexer.

A plurality of saturable devices may be operated in accordance with the principles of the present invention in order to provide a multiplexing system as shown in Fig. 8. In this arrangement a plurality of signals to be multiplexed are respectively fed to input windings 83, 84, 85 of saturable cores 86, 87, 88 to apply to the cores respective driving forces whose maximum magnitudes are considerably greater than the predetermined minimum magnetomotive force required to drive the cores into saturation whereby each signal will drive its associated core far into one state of saturation in accordance with the basic operation described heretofore. A carrier signal or train of unidirectional pulses from pulse generator 89 is applied in parallel to windings 90, 91 and 92 of the respective devices 86, 87, 88 in order to apply a series of driving force pulses to the cores and drive the latter from saturation as in the operation described in connection with Fig. 2. Output or sensing windings 93, 94 and 95 on the respective cores each has induced therein upon each shift of state of the associated core a pulse which is applied to gates 96, 97 and 98 individual to the respective cores. Gates 96 and 97, symbolically illustrated, may be identical with the magnetic gate 98 which as shown comprises a saturable magnetic core 99 normally in "closed" condition. The closed condition of the gate is achieved by the application of a current to the control winding 100 thereof which produces a saturating magnetomotive force substantially greater than the force produced by a pulse from winding 95 whereby when a pulse from the winding 95 is fed to the gate input winding 101, the core 99 will not be driven from saturation and no output pulse is induced in the sensing winding 102. Conversely, in the "open" condition of the gate the control current in winding 100 is low enough that a pulse from sensing winding 95 applied to winding 101 will drive the core 99 into its unsaturated region to generate an output pulse in sensing winding 102. The control current in winding 100 of each of the several gates are cyclically reduced by the operation of gating pulse distributor 103 which may, for example, sequentially change the connection of each of leads 104, 105 and 106 from a source of potential in the distributor which normally energizes the control windings of the gates to maintain the gating cores in "closed" condition to a lower source of potential. The magnetic gate illustrated is exemplary only and may, of course, be replaced by other gating circuits of similar function as is well-known in the art. The output of the several gates are connected together at 107 from whence the output from the one gate which is "opened" at any instant is fed through the diode 108, triode 109, and integrating circuit 110, 111, to feedback windings 113, 114 and 115 on the respective cores. The feedback windings 113, 114 and 115 series connected in the feedback circuit and may be series connected with an output resistor 116 as heretofore described. Elements 109, 110 and 111 are structurally and functionally similar to the corresponding elements 15, 18 and 19 of the circuit of Fig. 2 whereby the feedback circuit will tend to produce a feedback driving force in that one of cores 86, 87 and 88 which has the gate thereof "opened" as determined by the gating pulse distributor 103. As previously explained, the feedback force applied by each of the windings 113, 114 and 115 will be maintained equal and opposite to the input force of the individual core whose feedback circuit is completed through its corresponding "open" gate. The gating pulse distributor 103 "opens" the gates 96, 97 and 98 one at a time whereby the feedback circuit is closed through each of the cores in a sequence determined by the gating pulse distributor. Thus the feedback current from capacitor 111 will change in the gating sequence to sequentially balance the input forces. The output current through resistor 116 is a time mutiplexed amplified representation of each of the input signals. The amplification is provided by the provision of a proper turns ratio between each of the input and feedback windings on each core as previously described.

Figure 9:
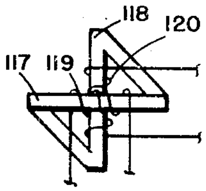
Fig. 9 illustrates a preferred core configuration.

It will be seen that for optimum performance of the apparatus described above it is desirable to minimize the coupling between the input windings such as 11, 37, 76 through 80, and 83 through 85 and the pulse windings 12, 44, 73, and 90 through 92, respectively, when the core is saturated. The ratio of the coupling between the input and pulse windings when the core is saturated and when it is not should be as small as possible. One method of reducing the saturated coupling is to orientate the input winding at right angles to the pulse winding. This may be effected by a core configuration such as shown in Fig. 9 wherein two core portions 117 and 118 are orthogonally related to each other with the input winding 119 wound on one of such core portions and the pulse winding 120 wound on the other portion.

The operating range of the above-described devices may be extended for a given input signal range by making that portion of the core about which the sensing winding is wound of a cross-sectional area which is less than the cross-sectional area of the rest of the core.

Illustrated in Fig. 10 is the circuitry of an embodiment of the invention substantially similar to that of Fig. 2 but which utilizes a saturable ferro-electric such as, for example, barium titanate. A signal from an input source 121 is applied, through resistor 122 of a resistive summing network 123, across the ferroelectric device 124. Unidirectional pulses from pulse generator 125 are applied through diode 126 and resistor 136 of the summing network across the ferroelectric in a direction to oppose the force applied by the input signal. The change in charge displacement is manifested as a change in the signal through resistor 127. A rapid change in charge displacement due to the shift of state of element 124 is differentiated in capacitance-resistance network 128, 129 to apply, through diode 130, unidirectional pulses to the grid of triode 131 which functions in substantially the same manner as triode 15 of Fig. 2. Pulses at the plate of triode 131 are integrated in resistance-capacitance network 132, 133. The discharge of the capacitor 133 is divided through output resistor 134 and resistor 135 of the summing network and applied through the latter to the ferroelectric in opposition to the input signal. The operation of the circuit is substantially similar to the operation of the circuit of Fig. 2 with bias 27 omitted. The applied forces are summed in network 123 rather than in the magnetic core and the amplification is provided by the division of the discharge current of capacitor 133 through resistors 134 and 135. The circuit in effect interrogates the ferroelectric to determine the state of saturation thereof. If the feedback force is greater than the input force, element 124 may be in one state of saturation due to the combined action of the two applied forces and the interrogating pulses applied by the pulse generator will not shift the state of the ferroelectric. Thus discharge current of the capacitor 133 will decrease. If the ferroelectric is driven into the other state of saturation by the combined input and feedback forces, the interrogating pulses will shift the state thereof and consequently the discharge current of the capacitor will increase. It is to be understood that the full scale magnitude of the input force and the magnitude of the interrogating pulses are considerably greater than the minimum force required to shift the ferroelectric between its saturated states in accordance with the principles set forth above.

Obviously many modifications and variations of the present invention are possible in the light of the above teachings. It is therefore to be understood that within the scope of the appended claims the invention may be practiced otherwise than as specifically described.

I claim:

1. Apparatus of the class described comprising a saturable device having a pair of opposite sense saturated states and a transition state therebetween, a signal source, means responsive to a signal from said source for driving said device into one of said saturated states considerably beyond said transition state, a pulse generator, means responsive to said generator for repetitively driving said device from said one state, feedback means for driving said device toward the other of said saturated states, means responsive to the shifting of said device from said one state for controlling said feedback means to maintain said device substantially at said transition state, and output means coupled with said feedback means.

2. Apparatus of the class described comprising a saturable device having a pair of opposite sense saturated states and a transition state therebetween, said device being shiftable to either of said saturated states upon the application thereto of a driving force of predetermined minimum magnitude, input means for receiving a variable amplitude direct current signal to be fed to said apparatus, means responsive to said input means for applying to said device a first driving force having a magnitude considerably greater than said minimum magnitude, whereby said input means may drive said device into one of said saturated states considerably beyond said transition state, pulse means for repetitively shifting said device from said one saturated state, and means responsive to said shifts from said one state for applying to said device a second driving force substantially equal and opposite to said first force.

3. Apparatus of the class described comprising a saturable device having a pair of opposite sense saturated states and a transition state therebetween, said device being shiftable from either of said saturated states upon application thereto of a driving force of predetermined minimum magnitude, means for applying to said device a first driving force of a sense and maximum magnitude sufficient to drive said device far into one of said saturated states considerably beyond said transition state, pulse means for repetitively shifting said device through said transition state, sensing means responsive to said repetitive shifting for generating an output signal, feedback means responsive to said output signal for maintaining said device substantially at said transition state.

4. The apparatus of claim 3 wherein said pulse means comprises means for applying to said device a train of force pulses of a sense opposite to the sense of said first driving force, each of said pulses having a magnitude at least equal to a predetermined maximum magnitude of said first force.

5. The apparatus of claim 3 including bias means for applying to said device a bias force of predetermined sense and magnitude, said pulse means including means for applying to said device a train of force pulses of sense opposite to said predetermined sense and of magnitude at least equal to the sum of said bias magnitude and said maximum magnitude of said first force, whereby said pulse means will effect said repetitive shifting regardless of the sense of said first driving force.

6. The apparatus of claim 3 wherein said means for applying said first force comprises input means for applying to said device a plurality of driving forces of relatively different magnitudes, the least of said last-mentioned magnitudes being substantially greater than said predetermined minimum magnitude, and means for energizing said input means to apply to said device a combination of said plurality of driving forces having a total magnitude indicative of a predetermined coded value.

7. The apparatus of claim 3 wherein said pulse means comprises means for applying to said device a train of force pulses of consecutively alternate polarity, said feedback means including means responsive to both said pulse means and said output signal for applying to said device a driving force of a sense opposite to the sense of said first driving force.

8. The apparatus of claim 7 wherein said first force comprises a combination of force components each of which has a magnitude substantially greater than said predetermined minimum magnitude.

9. A multiplexing system comprising a plurality of saturable devices each having a pair of opposite sense states and a transition state therebetween, each said device being shiftable from either of said saturated states upon application thereto of a driving force of predetermined minimum magnitude, input means respectively individual to each device for applying thereto an input force of a sense and maximum magnitude sufficient to drive each said device far into one of the saturated states thereof considerably beyond its transition state, means for repetitively shifting each said device from said one saturated state thereof, sensing means responsive to said repetitive shifting of said devices for generating an output signal, feedback means responsive to said output signal for sequentially maintaining each said device substantially at the transition state thereof.

10. Apparatus of the class described comprising a saturable device having a pair of opposite sense saturated states and a transition state therebetween whereby said device may be driven into one of said saturated states by the application thereto of a driving force of predetermined minimum magnitude, a signal source, means responsive to a signal from said source for applying to said device a driving force having a magnitude of which said minimum magnitude is but a small fraction whereby said device is driven into one of said saturated states considerably beyond said transition state, means for repetitively driving said device from said one state, means for sensing the shift of said device through said transition state, feedback means responsive to said sensing means for driving said device toward the other of said saturated states, and output means coupled with said feedback means.

11. Apparatus of the class described comprising a saturable device having a pair of opposite sense saturated states and a transition state therebetween, said device being shiftable from either of said saturated states upon application thereto of a driving force of predetermined minimum magnitude, means for applying to said device a first driving force of a sense and maximum magnitude sufficient to drive said device far into one of said saturated states substantially beyond said transition state, said minimum magnitude being a negligible fraction of the maximum magnitude of said first driving force, pulse means for repetitively shifting said device through said transition state, sensing means responsive to said repetitive shifting for generating an output signal, feedback means responsive to said output signal for maintaining said device substantially at said transition state.

12. A multiplexing system comprising a plurality of saturable devices each having a pair of opposite sense saturated states and a transition state therebetween, each said device being shiftable from either of said saturated states upon application thereto of a driving force of predetermined minimum magnitude, input means respectively individual to each device for applying thereto an input force of a sense and maximum magnitude sufficient to drive each said device far into one of the saturated states thereof considerably beyond its transition state, pulse means for repetitively shifting each said device from said one saturated state thereof, sensing means individual to each of said devices and responsive to said repetitive shifting thereof for generating output signals respectively individual to said devices, feedback means responsive to the output signal of each sensing means for applying to each said device a driving force substantially equal and opposite to the input force applied thereto, and means for sequentially coupling each of said sensing means with said feedback means.

13. Apparatus of the class disclosed comprising a saturable magnetic device shiftable between two opposite sense saturated states in response to the application thereto of a magnetomotive force of predetermined minimum magnitude, an input signal source, coil means on said device responsive to said input signal for applying to said device a first magnetomotive force having a maximum magnitude considerably greater than said minimum magnitude whereby said device is driven far into one of said saturated states upon energization of said coil means, means for repetitively applying to said device a plurality of magnetomotive pulses each having a magnitude at least equal to a predetermined maximum value of said first force whereby said device is repetitively shifted from said one state, a sensing winding on said device, feedback means responsive to said sensing winding for applying to said device a second magnetomotive force substantially equal and opposite to said first force, and output means coupled with said feedback means.

14. Apparatus of the class described comprising a saturable magnetic core having a pair of opposite sense saturated states and a nonsaturated state therebetween, said device being shiftable from either of said saturated states upon the application thereto of a magnetomotive force of predetermined minimum magnitude, an input winding on said core responsive to a variable amplitude direct current signal to be fed to said apparatus for applying to said core a first driving force having a maximum magnitude considerably greater than said minimum magnitude, whereby said signal may drive said device far into one of said saturated states considerably beyond said nonsaturated state, pulse means for repetitively shifting said device from said one saturated state, and means responsive to each said shift from said one state for applying to said device a second driving force substantially equal and opposite to said first force, said last-mentioned means including a feedback winding on said core having fewer turns than said input winding.

15. Apparatus of the class described comprising a saturable device having a pair of opposite sense saturated states, input means for applying to said device a first driving force, means for applying to said device during application of said first force a second driving force in opposition to said first force whereby said device may be driven into one of said saturated states by the combined action of said first and second forces, and control means for determining the sense of said one saturated state and for modifying said second force to drive said device toward the other of said saturated states.

16. Apparatus of the class described comprising a saturable device having a pair of opposite sense saturated states, input means for applying a first driving force of a first polarity to said device, means for applying to said device a second driving force of polarity opposite to said first polarity whereby the resultant of said first and second forces may drive said device into one of the saturated states thereof, means for repetitively shifting said device from said one saturated state to the other of said saturated states, and means responsive to said shifting for modifying said second force to decrease the difference in magnitude between said first and second forces.

17. Apparatus of the class described comprising a saturable magnetic core having a pair of opposite sense saturated states and a nonsaturated state therebetween, said device being shiftable from either of said saturated states upon the application thereto of a magnetomotive force of predetermined minimum magnitude, an input winding on said core responsive to a variable amplitude direct current signal to be fed to said apparatus for applying to said core a first driving force having a maximum magnitude considerably greater than said minimum magnitude, whereby said signal may drive said device far into one of said saturated states considerably beyond said nonsaturated state, a pulse winding on said core, pulse generator means coupled with said pulse winding whereby said device may be repetitively shifted from said one saturated state, a sensing winding on said core, and feedback means coupled with said sensing winding and responsive to the shifting of said device from said one state for applying to said device a second driving force substantially equal and opposite to said first force, said feedback means including a feedback winding on said core having fewer turns than said input winding.

18. Apparatus of the class described comprising a saturable ferroelectric device having a pair of opposite states of saturated charge displacement, input means for applying to said device a first electromotive driving force, means for applying to said device during application of said first force a second electromotive driving force in opposition to said first force whereby said device may be driven into one of said saturated states by the combined action of said first and second forces, and control means for determining the sense of said one saturated state and for modifying said second force to drive said device toward the other of said saturated states.

References Cited in the file of this patent

UNITED STATES PATENTS

| | | |
|---|---|---|
| 2,709,225 | Pressman | May 24, 1955 |
| 2,747,109 | Montner | May 22, 1956 |